Sept. 30, 1941.   S. F. LYBARGER   2,257,303
CARBON CELL
Filed July 13, 1940
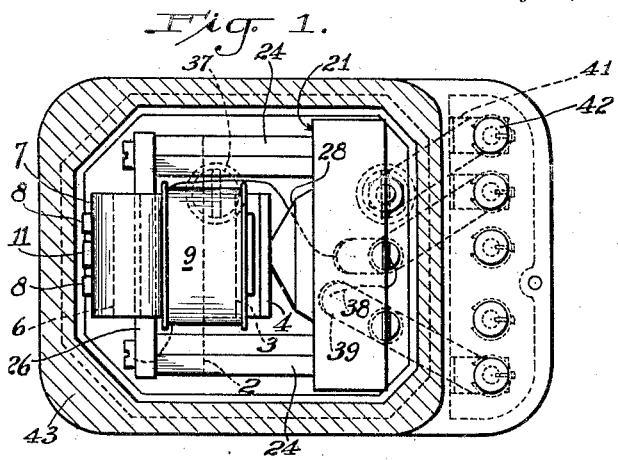
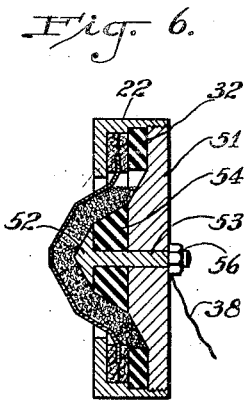
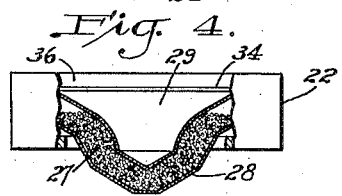
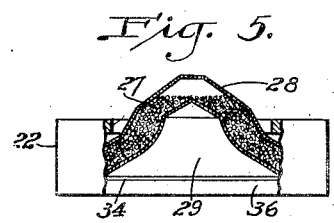
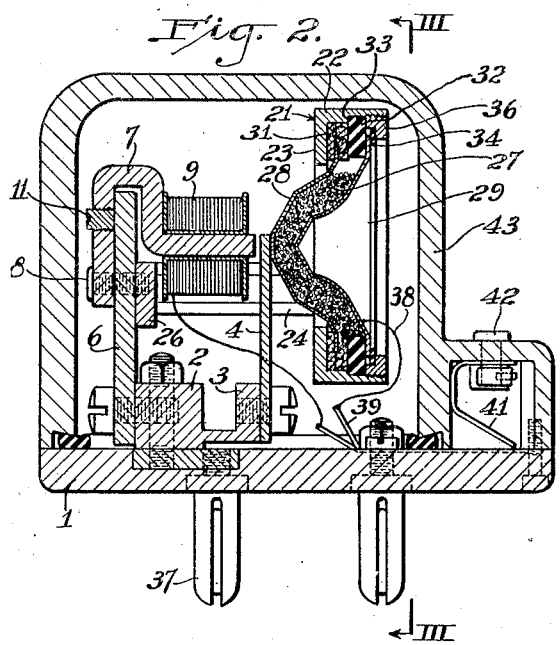
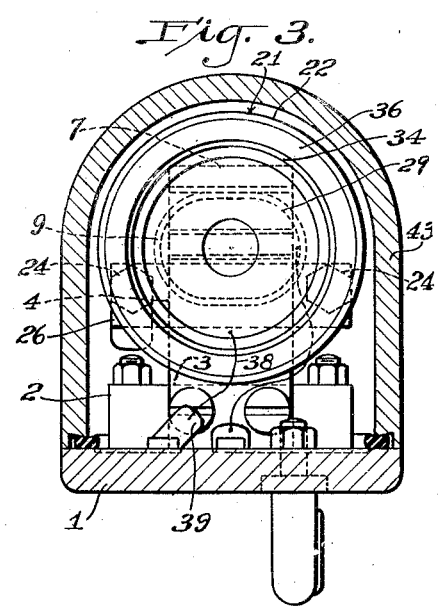
WITNESSES.
A B Wallace
V A Peckham
INVENTOR.
Samuel F. Lybarger
BY Brown, Critchlow & Flick
   his ATTORNEYS.

Patented Sept. 30, 1941

2,257,303

UNITED STATES PATENT OFFICE 2,257,303

CARBON CELL

Samuel F. Lybarger, Mount Lebanon, Pa., assignor to E. A. Myers & Sons, Mount Lebanon, Pa., a partnership consisting of Edward A. Myers, Edwin J. Myers, Alfred E. Pelz, and Samuel F. Lybarger Application July 13, 1940, Serial No. 345,435

7 Claims.  (Cl. 179—190)

This invention relates to carbon cells by which an electric current is varied in a microphone, amplifier or the like, and especially to those used with hearing aids for the hard of hearing.

The simplest type of carbon cell or microphone cell consists of two flat conducting plates with a space between them filled loosely with granular carbon. When operated with the conducting plates in a vertical position this cell has a very high efficiency, probably higher than most other types, because the vibration of the movable plate or electrode is in a direction at right angles to the conducting surfaces, whereby the carbon granular mass is given the maximum compression for a given relative movement of the two plates toward each other. The principal disadvantage of such a cell is that the efficiency depends upon its position, and if the plates are horizontal the carbon falls entirely away from one plate so that the cell is completely open circuited. A number of ways have been proposed to overcome the difficulty, such as by the use of concentric conical or hemispherical electrodes, but none has been entirely successful.

In the present invention a novel and more satisfactory arrangement of the electrodes is employed than ever used heretofore. Fundamentally, this cell really consists of two separate cells, one consisting of two circular electrodes suitably spaced apart and the other consisting of two annular electrodes of greater diameter likewise spaced apart. The two cells are spaced axially from each other and are connected by an annular passageway to permit the free flow of carbon from one cell to another. With this arrangement excellent operation is secured with the common axis of the cells horizontal. In this position practically all of the smaller circular cell is active, as well as a portion of the larger annular cell. When the axis of the cells is vertical with the smaller cell uppermost, the carbon granules, which only partially fill the unit fall away from the upper electrode of the upper cell, but the lower cell is totally active. With the larger cell uppermost the opposite is true. The carbon in the channel or passageway between the two cells provides in each case a "head" of pressure to insure that the contact between the granules and electrodes is adequate, but not so large as to pack the carbon. An appreciable amount of microphonic action may also occur in this channel.

It is among the objects of this invention to provide a carbon cell of this character which functions efficiently in any position, which is durable and dependable, and which is relatively simple and inexpensive in construction.

In accordance with this invention two electrode members are disposed adjacent each other with a space between their opposed surfaces in which a quantity of carbon granules or the like are contained in a loose mass. The space between the outer edges of the electrodes is sealed to hold the granules in place, but the sealing means is sufficiently yielding to permit one of the electrodes to vibrate relative to the other one in order to vary the pressure on the granules and thereby vary the electric current flowing through the cell. The vibratable electrode may be actuated by the armature of an amplifying unit, or directly by sound waves as in a microphone. For efficient operation the electrodes have opposed surfaces that are disposed at a relatively great angle to the axis of the cell, as much as 90° if desired, although a somewhat smaller angle is preferred. To prevent the carbon granules from falling away from the upper electrode surface when the cell is lying flat with either side up, the central and marginal portions of the electrodes have their opposed surfaces disposed in the manner just recited and they are connected by the opposed surfaces of the intermediate portions of the electrode members which are disposed at a smaller angle to the axis of the cell. The space between these intermediate portions is therefore more nearly vertical when the cell is lying flat, and forms a conduit or channel for the carbon granules that permits them to flow from the upper part of the cell to the lower part. The granules in this so-called conduit also form a head so that the granules between the more nearly horizontal lower surfaces of the electrodes make good contact with the electrode surfaces. The intermediate portions of the electrode members are preferably so arranged that but little current flows between them.

The invention is illustrated in the accompanying drawing in which Fig. 1 is a plan view of a hearing aid amplifier or intensifier with the top of its cover cut away and embodying my invention; Fig. 2 is a vertical longitudinal section through the amplifier; Fig. 3 is a vertical transverse section taken on the line III—III of Fig. 2; Fig. 4 is a transverse section of the carbon cell alone disposed with its vibratory electrode at the bottom; Fig. 5 is a view similar to Fig. 4 with the vibratory electrode at the top; and Fig. 6 is a vertical section through a modification of this invention.

Referring to the first three figures of the drawing, on the upper surface of a base plate 1, preferably made of a suitable insulating composition, there is mounted a block 2 of cold rolled steel or similar material that functions as a part of the magnetic circuit of the electromagnet of the amplifier, and also as a support for various other amplifier parts. This block is provided at one end with an L-shaped projection 3 spaced from the base and secured to the lower end of an upwardly extending armature 4. Fastened to the opposite end of the block is an upwardly extending permanent bar magnet 6 the upper portion of which carries a pole piece 7. The pole piece overlaps the outer surface of the magnet with its lower end fastened thereto by means of screws 8, and extends inwardly across the top of the magnet, then downwardly a short distance and then laterally away from the magnet. The latter portion of the pole piece carries a coil 9 and is placed a short distance from armature 4 to form an air gap. The spacing of the gap may be varied by a set screw 11 threaded in the overlapping portion of the pole piece and bearing against the magnet. The construction described thus far is substantially the same as that disclosed in my Patent No. 2,145,603.

At the side of the armature opposite to the magnetic coil a carbon cell 21 is mounted. The housing for this cell is a ring 22 having an inner radial flange 23 at its inner edge. The housing is rigidly supported in position by means of horizontal rods 24 connected to flange 23 and a cross bar 26 the central portion of which is fastened to the inner face of magnet 6. The two sides of the cell between which the usual carbon granules 27 are disposed are formed by two circular diaphragm-like electrodes 28 and 29. The inner electrode 28 is rigidly connected to the upper end of armature 4, and to permit it to be vibrated thereby its edge is held rather loosely within ring 22 between a pair of soft gaskets 31. The outer electrode 29 is rigidly mounted in the ring the desired distance from the inner electrode between a hard insulating spacing washer 32 engaging a radial shoulder 33 in the ring, and a thin insulating washer 34 clamped against the outer electrode by a retaining ring 36 screwed in the outer end of the housing ring.

As shown in Fig. 2, the electric circuit through this carbon cell is made through a jack plug 37 depending from base 1 of the amplifier, block 2, armature 4, the inner electrode, the carbon granules, the outer electrode, and through a wire 38 connected to the latter and to a terminal 39 that is engaged by a spring conductor 41 connected to a plug socket 42 mounted in the cover 43 of the instrument.

It is a feature of this invention that this carbon cell operates satisfactorily regardless of the position in which it may be held. Accordingly, both electrodes are concave or generally cup-shape with the outer electrode projecting or nested into the inner one concentrically therewith. The central and marginal portions of the two electrodes are disposed at relatively great angles to their axis, as shown in Fig. 2, so that the cell will function efficiently. These two portions of the electrodes are connected by their intermediate portions which are disposed at a materially smaller angle to the axis of the cell so that when the cell is lying flat with either electrode uppermost (Figs. 4 and 5) some of the carbon granules in the upper portion of the cell will freely settle down through the intermediate space and by their weight hold the granules in the lower portion of the cell against both electrodes in order to provide good contact with them. Although the central and marginal portions of the electrodes might be disposed at 90° to their axis, it is found that the granules flow from one part of the cell to another more freely if the angle is about 60°. In such a case the electrodes of the two most active portions of the cell are not far from being flat, resulting in high efficiency because of the direct compression of the carbon granules between them. The conical form, however, permits easy movement of the granules from one portion of the cell to another, and the contact of the carbon against the electrodes adjacent the connecting channel is greatly improved. The connecting channel should make a relatively small angle with the axis of the cell so that a relatively long channel is formed without unduly increasing the diameter of the cell. Such a channel gives a better "head" of carbon when the axis is vertical and results in more stable operation.

As the intermediate portions of the electrodes are disposed at a smaller angle to the axis of the cell than the central and marginal portions, it follows that vibrations of the inner electrode do not act upon the carbon granules in the intermediate space in as pronounced a manner as on the granules in the other parts of the cell. Therefore, it is desirable that only a relatively small percentage of the total electric current should flow across that intermediate space, because it will not be used as effectively as elsewhere in the cell. Accordingly, the intermediate portions of the electrodes may be spaced farther apart than the central and marginal portions, thereby increasing the resistance to flow of current between them and confining the greater portion of current flow to the central and marginal portions of the cell.

In the modification shown in Fig. 6 the outer electrode member, instead of being a diaphragm, is a multiple part member formed from an outer disc 51 screwed into the housing ring 22 against spacing washer 32, a conical inner element 52 having an integral pin 53 extending outwardly through the center of the disc, and a frusto-conical intermediate member 54 encircling the pin. These three elements are rigidly connected together by a nut 56 threaded on the end of the pin. Intermediate member 54 is a non-conductor of electricity so that current will not flow from it across the intermediate portion of the space between the two electrodes.

Another important feature of this invention is that the shape of the vibratory electrode is such that very high mechanical strength exists, permitting the use of extremely thin brass or aluminum for this electrode. The low mass of this moving part contributes to good high frequency response in the device in which it is used. Brass only two one-thousandths of an inch thick, gold plated to provide a good contact surface, has been found very strong and light.

According to the provisions of the Patent Statutes, I have explained the principle and construction of my invention, and have illustrated and described what I now consider to be its best embodiment. However, I desire to have it understood that, within the scope of the appended claims, the invention may be practiced otherwise than as specifically illustrated and described.

I claim:

1. A carbon cell comprising a cupped electrode member, a second electrode member projecting into the cupped member and spaced therefrom, said members having central portions and marginal portions connected by intermediate portions, and carbon granules occupying the space between said electrode members and adapted to engage said portions thereof, the opposed surfaces of said central and marginal portions of said members being conductors of electricity and being disposed at a greater angle to the axis of the members than the angle at which the opposed surfaces of said intermediate portions of said members are disposed relative to said axis.

2. A carbon cell comprising a cupped electrode member, a second electrode member projecting into the cupped member and spaced therefrom, said members being of general conical shape and having central portions and marginal portions connected by intermediate portions, and carbon granules occupying the space between said electrode members and adapted to engage said portions thereof, the opposed surfaces of said central and marginal portions of said members being conductors of electricity and being disposed at a greater angle to the axis of the members than the angle at which the opposed surfaces of said intermediate portions of said members are disposed relative to said axis.

3. A carbon cell comprising a cupped electrode member, a second electrode member projecting into the cupped member and spaced therefrom, said members having central portions and marginal portions connected by intermediate portions, and carbon granules occupying the space between said electrode members and adapted to engage said portions thereof, the opposed surfaces of said central and marginal portions of said members being conductors of electricity and being disposed at a greater angle to the axis of the members than the angle at which the opposed surfaces of said intermediate portions of said members are disposed relative to said axis, said opposed surfaces of the intermediate portions being spaced farther apart than said central and marginal portions.

4. A carbon cell comprising a pair of cupped electrodes nested in spaced relation and having central portions and marginal portions connected by intermediate portions, and carbon granules occupying the space between said electrods and adapted to engage said portions thereof, the inner surfaces of said central and marginal portions of the electrodes being conductors of electricity and being disposed at an angle of more than 45 degrees to the axis of the electrodes, and the inner surfaces of said intermediate portions of the electrodes being disposed at a smaller angle to said axis.

5. A carbon cell comprising a pair of cupped electrodes nested in spaced relation and having central portions and marginal portions connected by intermediate portions, and carbon granules occupying the space between said electrodes and adapted to engage said portions thereof, the inner surfaces of said central and marginal portions of the electrodes being conductors of electricity and being disposed at an angle of more than 45 degrees to the axis of the electrodes, and the inner surfaces of said intermediate portions of the electrodes being disposed at a smaller angle to said axis and being spaced farther apart than said central and marginal portions.

6. A carbon cell comprising a cupped electrode member, a second electrode member projecting into the cupped member and spaced therefrom, said members having central portions and marginal portions connected by intermediate portions, and carbon granules occupying the space between said electrode members and adapted to engage said portions thereof, the opposed surfaces of said central and marginal portions of said members being conductors of electricity and being disposed at a greater angle to the axis of the members than the angle at which the opposed surfaces of said intermediate portions of said members are disposed relative to said axis, said intermediate surfaces of at least one of said electrode members being a nonconductor of electricity.

7. A carbon cell comprising a cupped electrode member, a second electrode member projecting into the cupped member and spaced therefrom, said members having central portions and marginal portions connected by intermediate portions, and carbon granules occupying the space between said electrode members and adapted to engage said portions thereof, the opposed surfaces of said central and marginal portions of said members being conductors of electricity and being disposed at a greater angle to the axis of the members than the angle at which the opposed surfaces of said intermediate portions of said members are disposed relative to said axis, said intermediate portion of said second electrode member being a frusto-conical insulator.

SAMUEL F. LYBARGER.